(12) United States Patent
Hardacker et al.

(10) Patent No.: US 7,839,298 B2
(45) Date of Patent: Nov. 23, 2010

(54) SYSTEM AND METHOD FOR UNIVERSAL REMOTE CONTROL

(75) Inventors: Robert Hardacker, Escondido, CA (US); Ryuichi Iwamura, San Diego, CA (US); Peter Shintani, San Diego, CA (US); Edgar Allan Tu, Poway, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 12/694,106

(22) Filed: Jan. 26, 2010

(65) Prior Publication Data

US 2010/0127886 A1 May 27, 2010

Related U.S. Application Data

(63) Continuation of application No. 11/545,377, filed on Oct. 10, 2006, now Pat. No. 7,719,438.

(51) Int. Cl.
 *G05B 19/02* (2006.01)
(52) U.S. Cl. ............... 340/825.22; 340/10.5; 340/10.1; 725/131

(58) Field of Classification Search ............ 340/825.22, 340/10.5; 725/131
See application file for complete search history.

(56) References Cited

U.S. PATENT DOCUMENTS

| | | | |
|---|---|---|---|
| 7,118,034 B2* | 10/2006 | Baldassari et al. | 235/383 |
| 7,142,092 B2* | 11/2006 | Ramamurthy et al. | 340/10.1 |
| 2002/0008656 A1* | 1/2002 | Landt | 342/42 |
| 2003/0110512 A1* | 6/2003 | Maari | 725/131 |
| 2004/0070491 A1* | 4/2004 | Huang et al. | 340/10.5 |
| 2005/0015467 A1* | 1/2005 | Noda | 709/220 |
| 2006/0054681 A1* | 3/2006 | Park et al. | 235/375 |
| 2008/0018327 A1* | 1/2008 | Reynolds | 324/200 |
| 2008/0094245 A1* | 4/2008 | Hardacker et al. | 340/825.22 |

\* cited by examiner

*Primary Examiner*—George A Bugg
*Assistant Examiner*—Bradley E Thompson
(74) *Attorney, Agent, or Firm*—John L. Rogitz

(57) ABSTRACT

Control information is exchanged between a component and a remote control device or a server using RFID or using network discovery procedures. The control information if gathered by the server is provided to the remote. In this way, the need to manually program the remote with component code information is eliminated.

12 Claims, 5 Drawing Sheets

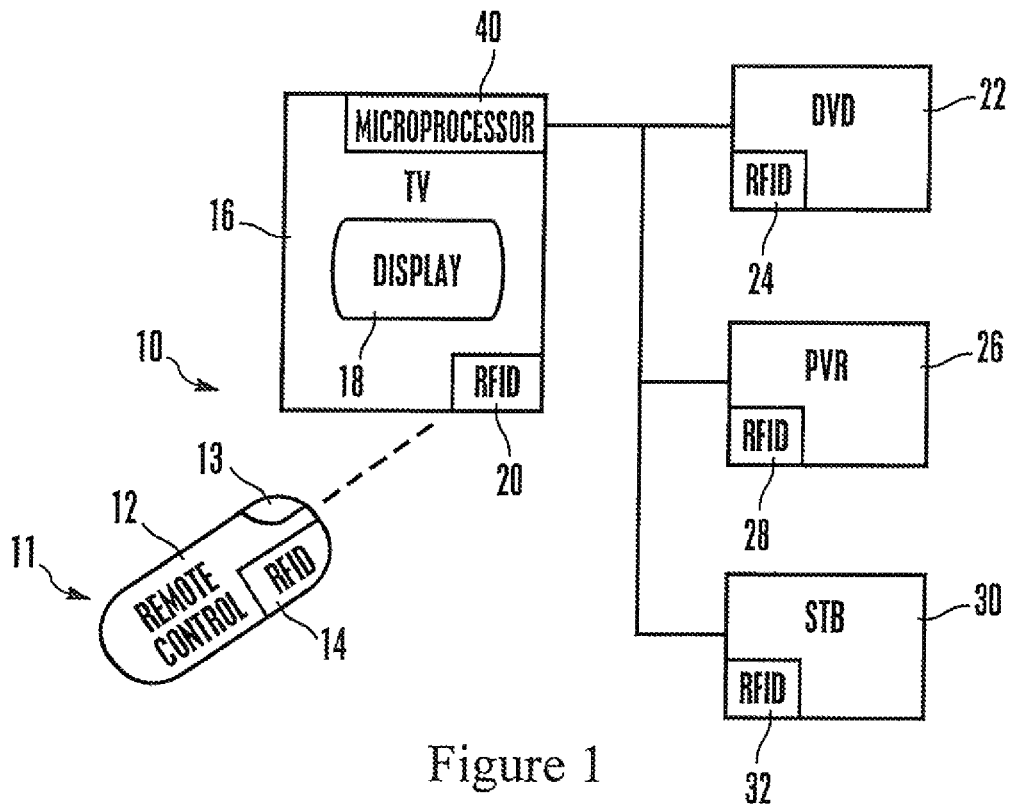
Figure 1
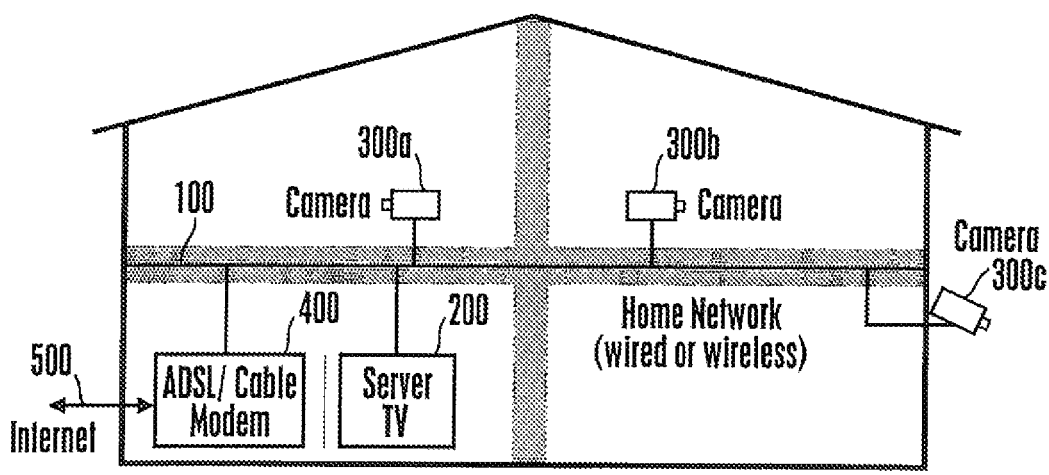
Figure 2  Home Network

Server TV (200)

Camera (300)

IR Remote Commander (600)

SYSTEM AND METHOD FOR UNIVERSAL REMOTE CONTROL

This is a continuation of and claims priority to U.S. patent application Ser. No. 11/545,377, filed Oct. 10, 2006 now U.S. Pat. No. 7,719,438.

FIELD OF THE INVENTION

The present invention relates generally to systems and methods for universal remote controls or other RFID/Near Field Communications (NFC) applications.

BACKGROUND OF THE INVENTION

In an effort to resolve the burden on users from possessing a confusing number of remote control devices, e.g., one each for a server, a personal video recorder (PVR), a digital video disk (DVD) player, a set-top box (STB), display, personal computer, etc., so-called universal remote controls have been provided to operate all of the components a user might have in a home network. As understood herein, programming a universal remote control can be problematic, requiring a user to enter manufacturer and device codes for each device sought to be controlled. Indeed, since some devices can use more than one signaling code, the user might have to experiment with multiple codes to determine which one works with a particular device. As recognized herein, it would be desirable to relieve the user of cumbersome and often confusing programming of a universal remote control or other RFID/NFC applications.

SUMMARY OF THE INVENTION

A home network system includes remote control device, a TV or other display device, and one or more components having associated component information necessary for the remote control device to control the component, which can be, without limitation, a camera, DVD player, PVR, server or STB. The component information is provided to the remote control device automatically over a network path that is associated with the system to eliminate the need to manually program the remote control device with the component information.

RFID, Radio Frequency Identification, which is also referred to as "Near Field Communications" (NFC) and which us known under various tradenames such as "Felica" and "Mifare", typically defines a technology consisting of two basic components: an active reader/writer and a passive component device, herein referred to as a "reader" or "tag". A reader/writer transmits a wireless signal to the tag. The tag "harvests" energy contained in the transmission to power its circuitry enabling the tag to respond to the reader/writer. The network path may be an RFID path, in which case the remote control device can have a remote RFID reader/writer and the component can have a component RFID assembly carrying the component information for reading thereof by the remote control device. Alternatively, the network path can include an RFID path, and the TV can have a TV RFID reader/writer. The component can have a component RFID assembly carrying the component information for reading thereof by the TV, with the TV sending the component information to the remote control device. As still another alternative, the TV can communicate with the component over a home network, and the TV obtains the component information automatically and securely by means of network discovery protocol. The TV then provides the component information to the remote control device.

In another aspect, a method includes automatically obtaining for a remote control device, over a communications path, component information from a component in a home network. The method also includes using the remote control device to control the component at least in part by accessing the component information.

In still another aspect, a home network includes a TV or other display device, a remote control device wirelessly inputting signals to the TV, and at least one component sending video information to the TV over a home network path (including paths such as DVD player-to-TV connections) and receiving commands from the remote control device. The remote control device is operably capable to control the component by means of component information. Means are provided within a dwelling hosting the home network for automatically providing the component information to the remote control device.

As used below, "RFID reader/writer" is a superset. In less preferred embodiments, some of the reader/writers disclosed below could be embodied as RFID readers, or "tags". The passive tag or reader contains useful information, the type of which is dependent upon its connectivity back to the TV device.

Additionally, while various embodiments below discuss a server, more generally the center device of the invention can be a non-networked TV, a networked TV, a server TV, or a networked server TV in a TV-centric environment. In all instances "TV" can also refer to a display device without an internal tuner. From a different perspective, the main or center device can be a networked server and/or a PC.

More specifically, the center device can be a conventional TV with direct connection devices like VCR, DVDs, PVRs, etc. connected via HDMI, RGB, Y/C, CVBS. The RFID reader/writer of the server described below enables these devices to be controlled via a universal remote. In the case of a center device that is a TV with some network connectivity (wired, wireless, ethernet, powerline communications, etc. the capabilty is added to control networked interface devices, e.g., a PC server that has content stored on it. In this case the RFID reader/writer does not necessarily learn IR commands to directly control devices, but it can learn network information such as MAC address, security key, signalling protocol. Once the RFID reader/writer conveys the necessary network control, communication information either by direct contact with the PC server or relayed by the remote commander, the network TV can begin communicating with the PC server & learn the control functions (such as rewind, etc. vs. TCP/IP) to teach to the remote commander.

In the case of a server TV, a HDD or other storage media is added to the TV. It can only record content presented to it by other direct connected devices or by tuner connections. In the case of a networked server TV, such a device can also share content from its HDD (file transfer) or RT media streaming sourced from other means (internet, broadcast) to other devices on the network. The RFID role is essentially the same as described in the three possibilities described above.

Thus, with the present invention a device may be directly controlled via IR commands while at other times control is across a network. In the latter case, the RFID aids in the network pairing upon the addition of a new device.

In another aspect, a system includes a server having a server RFID component, a display presenting content from the server, and a client having a component RFID component. In accordance with this aspect, the server and component exchange an encryption key and/or information necessary to generate the encryption key using the RFID components for subsequently encrypting communication between them using the encryption key.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting system of the present invention;

FIG. 2 is a block diagram of a non-limiting specific implementation of a system according to the present invention;

DETAILED DESCRIPTION OF THE PREFERRED EMBODIMENT

Figure 3:
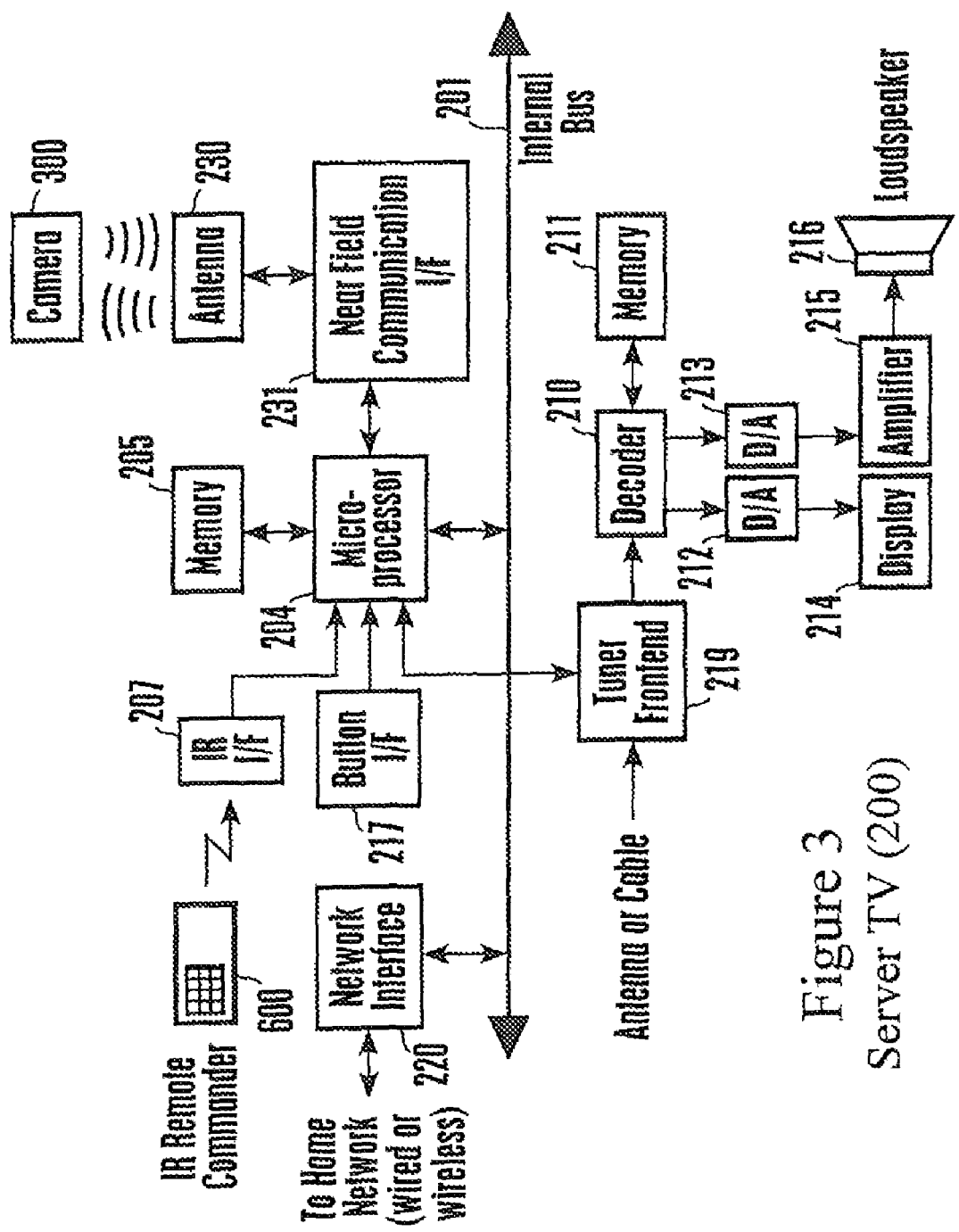
FIG. 3 is a block diagram of a non-limiting specific implementation of a server TV according to the present invention.

Referring initially to FIG. 1, a system is shown, generally designated 10, which includes a portable hand-held housing 11 embodying a remote control device 12 having, in the preferred embodiment shown, an RF and/or IR transmitter 13 for sending remote commands in accordance with principles known in the art and also having a relatively shorter range radio frequency identifier (RFID) reader/writer 14 for communicating in accordance with RFID principles known in the art. Thus, the remote control may communicate using RFID and may also communicate via another RF band or via infrared with a display device, such as a personal computer with a display or a TV 16 (with TV tuner) having a display 18. The TV 16 may also have an RFID reader/writer 20 mounted on it. By "mounted" is meant to include reader/writers that are connected to TVs using so-called "external dongle" connections.

Additional components may be controlled by the remote control device 12, including, by way of non-limiting example, a DVD player 22 with associated RFID device 24, a personal video recorder (PVR) 26 with associated RFID device 28, and a STB 30 with associated RFID device 32, all of which components can communicate with the TV via wired or wireless links. The location of each RFID device on its respective component may be visually indicated by, e.g., lines or other markings. The RFID devices 24, 28 and 32 may be RFID tags or if desired RFID reader/writers.

The component RFID devices can be a so-called Felica device or Near Field Communications (NFC) devices, although other RFID technology may be used. An NFC or a Felica device when used in accordance with the present invention has a microprocessor and non-volatile memory (NVM) typically embodied in a Smart Card. The component RFID devices 24, 28, 32 may be implemented by tokens resembling a small disk and/or integrated circuit that are unpowered. In any case, placing a component RFID device (including an NFC device with chip and antenna or Felica device) close (e.g., within an inch or so) to the RFID reader/writer 14 of the remote control 12 or close to the RFID reader/writer 20 of the TV 16 energizes the Felica Card, token, or chip. It can then be read and/or written to by the reader/writer 14/20.

The information in the NVM of the components 22, 26, 30 can thus be transferred to the remote control 12 and/or to the TV 16. As set forth further below, the information can be used to program the functionality of the remote control 12.

Thus, as contemplated herein, a user can touch (or closely juxtapose) the RFID reader/writer 14 on the remote control 12 with each RFID device on the components 22, 26, and 30 in succession, potentially aided by the visual indications disclosed above, to cause information in each successive component to automatically be read by the remote control 12. The information can include functions of various buttons on the remote control 12 pertaining to that component, along with, if desired, signaling methods. manufacturer and device ID codes, etc. This download is done using RFID information exchange principles known in the art, automatically once the RFID devices are close enough to each other to trigger information exchange. Then, the user can touch (or closely juxtapose) the RFID device 14 on the remote control 12 with the RFID device 20 on the TV 16 to transfer the information from the components 22, 26, 30 to the TV if desired. Or, the components can be positioned close to the TV to allow the TV to read the component information using RFID, and then to send the component information to the remote control device.

FIGS. 2-5 show specific non-limiting examples of a system and components that can implement the above principles. Referring first to FIG. 2, a home network can include a server TV 200 communicating over a network 100 with various remotely-controlled components to display information from the components on the TV. Non-limiting components may include, in addition to those discussed above, three still or video cameras 300a, 300b, 300c. The server TV 200 may also communicate with a modem 400 and thence with the Internet 500 as shown.

As shown in FIG. 3, a remote commander 600, which can be a specific non-limiting implementation of the remote control device 12 shown in FIG. 1, can communicate with the server TV 200 via, e.g., infrared (IR). The TV 200 can be a conventional TV with directly connected devices such as DVDs, or a networked TV including networked content sources supporting streaming media with control extended from a remote to the TV across the network interface to the device in question, a server TV with HDD or other memory device to enable storage of content from terrestrial and/or cable sources, or a combination of the above.

In any case, the server TV 200 may include an IR interface 207 to receive signals from the remote commander 600. The output of the IR interface 207 is sent to a server TV microprocessor 204 which can access a memory 205 such as a read-only memory (ROM), random access memory (RAM), flash memory, or even disk memory.

The TV microprocessor 204 is on an internal TV bus 201 for communicating with a decoder 210 that can access a decoder memory 21.1. As shown, the decoder 210 receives antenna or cable TV signals from a tuner/frontend 219 for decoding. If analog, the video output from the tuner/frontend 219 can be first analog-digital converted in an analog to digital converter. In any case, the decoder 210, alone or in cooperation with the TV microprocessor 204, decodes the signals in accordance with principles known in the art to output an audio signal to an audio digital to analog converter 213 and thence to an audio amplifier 215 for playing on speakers 216. The decoder 210 also outputs a video signal to a video digital to analog converter 212 and thence to a video display 214 such as a cathode ray tube or flat panel display such as a liquid crystal display or other display type.

FIG. 3 shows that the TV microprocessor 204 can also communicate with a network interface 220 for communicating with the components shown in FIG. 2 over the network 100.

The TV 200 may also be provided with an input device such as a keypad, in which case signals from the input device can be received by a button interface 217 and sent to the TV microprocessor 204.

As intended by the implementation shown in FIG. 3, the TV microprocessor 204 communicates with a near field communication interface 231 such as an RFID interface. The near field communication interface is connected to a near field antenna 230 for communicating via RFID with the components discussed above, including, e.g., the cameras 300.

Figure 4:
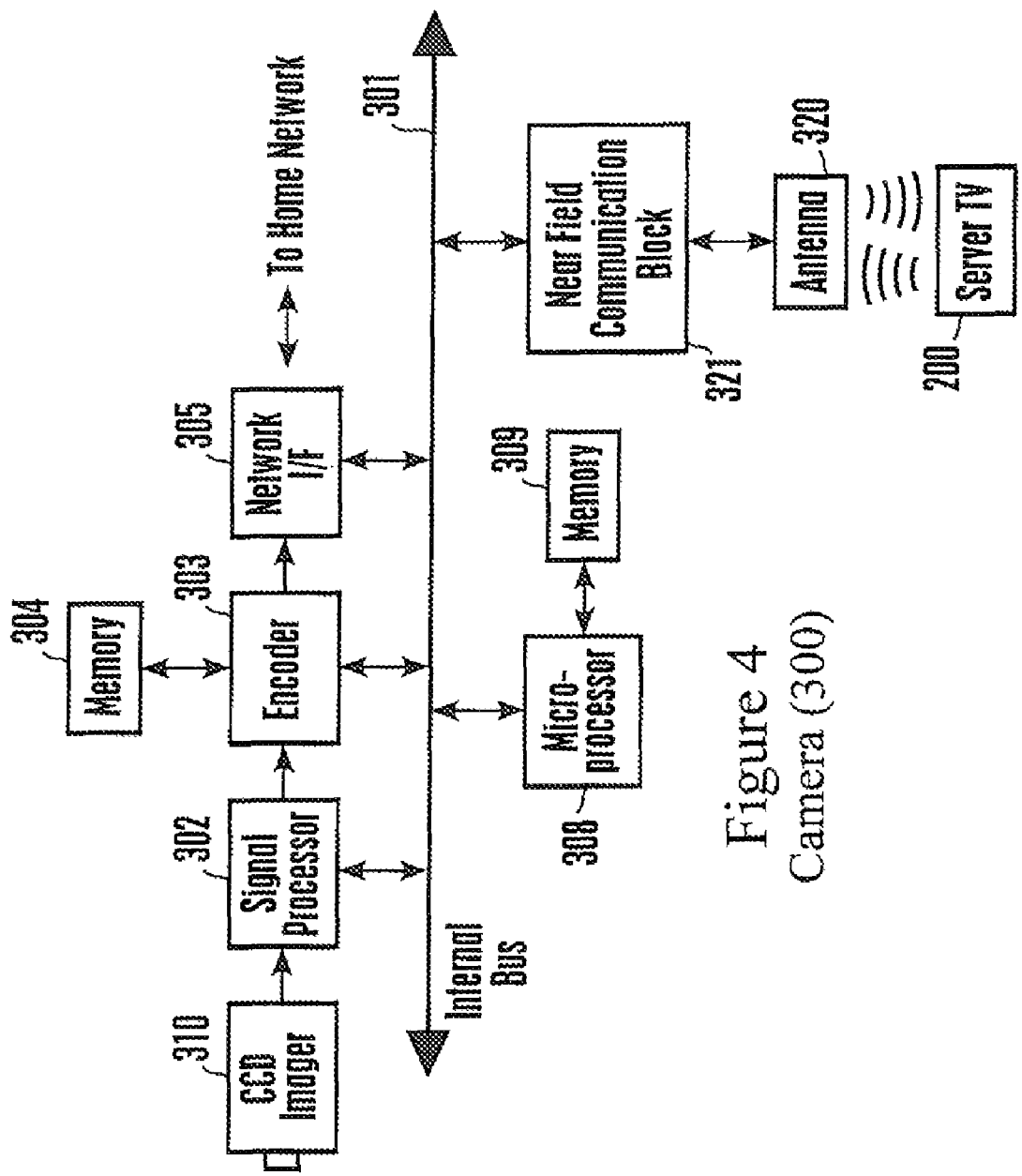
FIG. 4 is a block diagram of a non-limiting specific implementation of a remotely controlled component, in this case a camera, according to the present invention.

FIG. 4 shows a non-limiting implementation of one of the cameras 300 shown in FIG. 2. A signal processor 302 can receive input from an imager 310 such as a CCD imager and can communicate with an internal camera bus 301 with a camera microprocessor 308 accessing a camera memory 309 in accordance with principles known in the art to record and playback images. The signal processor 302 may also communicate with an encoder 303 accessing an encoder memory 304, also in accordance with video camera principles known in the art. The encoder 303 can output signals to a network interface 305 that can communicate with the network 100 shown in FIG. 2. Like the encoder 303 and camera microprocessor 308, the network interface 305 may be connected to the internal camera bus 301 as shown.

As mentioned above, the camera 300 can communicate with the server TV 200 not only over the network 100 but also using RFID, and to this end the camera 300 includes a near field communication antenna 320 accessing a near field communication block 321, which may be implemented as a token or a sticker, and which need not be connected to any of the other hardware blocks of the camera 300. The near field communication block 321 can store an ID number and/or the MAC address of the network interface 305, so that this information can be read by the remote commander RFID reader/writer or TV RFID reader/writer.

Figure 5:
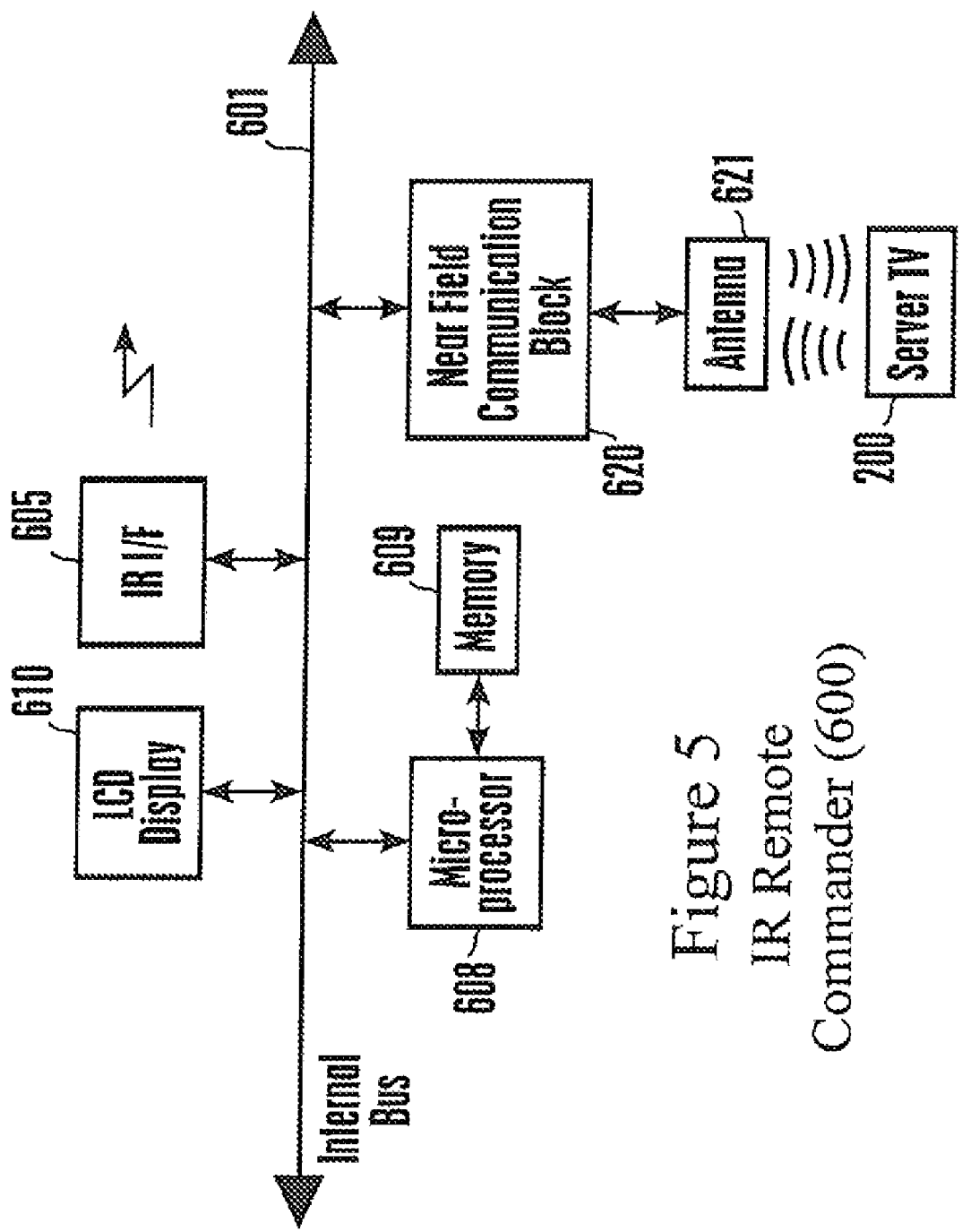
FIG. 5 is a block diagram of a non-limiting specific implementation of a remote control device, also referred to as a "remote commander", according to the present invention.

FIG. 5 shows a non-limiting implementation of the remote commander 600. A remote microprocessor 608 communicates with an internal, remote bus 601 and can access a remote memory 609. The remote microprocessor 608 can display information on a remote commander display 610 and can communicate with the components mentioned above using an IR interface 605.

Additionally, a remote commander near field communication interface 620 can be on the internal remote bus 601 for communicating with a near field antenna 621 on the remote commander. As shown in FIG. 5, the remote commander can communicate, via RFID, with various other network components, including, e.g., the server TV 200.

To register a camera 300 for network operation, the user can dispose the camera close to the server TV 200 so that the antennas 230 and 320 automatically communicate each other in accordance with RFID principles. Alternatively the remote commander may be used as a relay to carry the camera registration information back to the TV if it is inconvenient or difficult to co-locate the TV and camera. The server TV 200 reads the ID number through the near field communication interface 231. If desired, the camera 300 may locally encrypt the ID number. The ID preferably is encrypted with the key which is already defined or generated by the already defined procedure(s). The server TV 200 decrypts it to obtain the original ID number. This optional feature requires a microprocessor or an encryptor in the near field communication block 321 of the remote commander 600.

The ID number or other data transmitted by near field communications can be used as a common key.

The server TV 200 can encrypt communications for device registration and other data with the common key. This encrypted data is then sent to the client camera 300 over the home network 100. The client camera 300 decrypts them with the common key. With this feature, an adversary cannot tap the communications without the common key, and it is very hard to detect the near field communication from distance.

Figure 6:
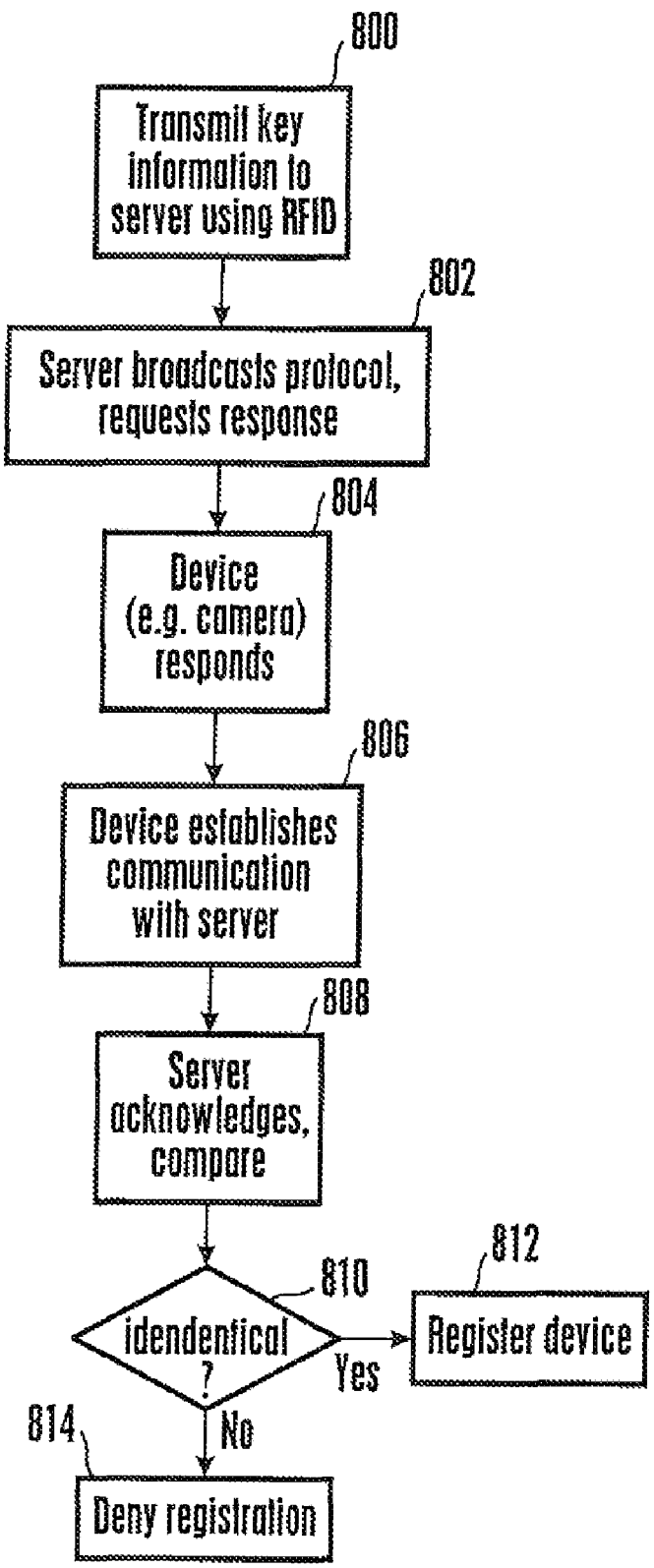
FIG. 6 is a flow chart of device discovery logic.

FIG. 6 is an example of device discovery procedures between the server TV 200 and the camera 300. At block 800 the common key and other device information is transmitted from the camera 300 to the server 200 by near field communications. Moving to block 802, the server TV 200 broadcasts a UDP/IP (User Datagram Protocol/Internet Protocol) and asks the new device to respond. Proceeding to block 804, the device, which could be, e.g., the camera 300, responds with a UDP/IP message. At block 806 the device (e.g., the camera 300) establishes a TCP/IP (Transmission Control Protocol/Internet Protocol) communication with the server TV 200. An encrypted message is sent from the camera 300 to the server TV 200. The message may include the same data transmitted by the near field communication.

Proceeding to block 808, the server TV 200 returns an acknowledge to the device (e.g., the camera 300). The server TV 200 also compares both data. If they are identical at decision diamond 810, the camera 300 is identified as the right device and registered at block 812; otherwise, registration is refused at block 814. This process advantageously can be used to prevent an illegal device from impersonating the camera 300.

The RFID tag of the camera 300 may store only a device ID. All the device information is not required. Once the server TV 200 obtains the device ID, the device ID is used as a common key. The camera 300 transmits all the other data with encrypted communications.

Accordingly, it may now be appreciated that the user does not have to enter any ID number, password or any MAC address, but rather only touch the antenna 230 with the camera 300.

Additionally, the server TV 200 may exchange data with the remote commander 600, e.g., both component information and/or TV program guide data can be downloaded to the remote 600 and displayed on the remote display 610 using the RFID reader/writers discussed above by placing the remote commander 600 near the server TV 200. Since RFID communication rate can be relatively low, when the remote 600 is touched to the TV 200, only the most prioritized data, for example, todays TV program information, can be sent. For additional data exchange, the TV 200 may have a cradle for the remote. In the cradle, the TV and remote RFID antennas 230 and 621 are so close that they continuously communicate with each other.

As recognized herein, the system shown in FIGS. 2-6 is also advantageous for a device with no large display, for example, an audio client speaker. In such a case, the user can select a favorite tune from a music list on the remote LCD display 610. The remote commander in response sends an IR command to the audio client speaker, which is forwarded to a remote server that can begin streaming back the selected tune.

In another embodiment, the manufacturer and device ID information may be communicated over the network 100. In this embodiment, the TV discovers other components on the network and sends the component information to the remote control device using IR or RF. The remote control device can be preprogrammed with a library of signaling codes which are then activated according to information received from the TV, eliminating the need to manually program the remote.

The home network may be an Ethernet, IEEE-1394 network, digital living network association (DLNA) network, high definition multimedia interface (HDMI) network, etc., and network discovery processes can be used to discover components on the network. For example, in an HDMI network, consumer electronic control (CEC) processes can be used by the TV to discover the components on the network and obtain the data that is then sent to the remote. In the case of an IEEE-1394 network, IEEE-1394 discovery processes can be used. Other discovery methods may be used. If a component cannot be identified or is not supported in the library, the TV can automatically download the necessary codes from the Internet or, as a last resort, display a message that the component is not supported.

While the particular SYSTEM AND METHOD FOR UNIVERSAL REMOTE CONTROL is herein shown and described in detail, it is to be understood that the subject matter which is encompassed by the present invention is limited only by the claims.

What is claimed is:

1. A method comprising:
  receiving configuration information from a home network component by radiofrequency identification (RFID);
  establishing a non-RFID link with the component;
  receiving the configuration information from the component over the non-RFID link;
  comparing the configuration information received by RFID with the configuration information received over the non-RFID link;
  in response to determining that the configuration information received by RFID matches the configuration information received over the non-RFID link, permitting the component to communicate with at least one node in a network; and
  in response to determining that the configuration information received by RFID does not match the configuration information received over the non-RFID link, not permitting the component to communicate with the at least one node in the network.

2. The method of claim 1, wherein the component is a camera.

3. The method of claim 1, wherein the component is a DVD player or PVR or set-top box or personal computer or CD/MD player/recorder.

4. The method of claim 1, wherein at least a portion of the communications path is an RFID path, a remote control device having a remote RFID reader/writer and the component having a component RFID assembly carrying the component information for reading thereof by the remote control device.

5. The method of claim 1, wherein at least a portion of the communications path is an RFID path, a server having a server RFID reader/writer and the component having a component RFID assembly carrying the component information for reading thereof by the server, the server sending the component information to a remote control device.

6. The method of claim 1, wherein a server communicates with the component over a home network, the server obtaining the component information automatically by means of network discovery protocol and providing the component information to a remote control device.

7. A home network, comprising:
  at least one server having at least one radiofrequency identification (RFID) element;
  at least one remote control device wirelessly inputting signals to the server using RFID received by the RFID element of the server;
  the server comparing the signals received from the remote control device through the RFID element with signals received over a non-RFID communication link and responsive to the comparison determining whether to grant a component access to the home network.

8. The network of claim 7, wherein the component is a camera.

9. The network of claim 7, wherein the component is a DVD player or PVR or set-top box or computer or CD/MD player.

10. The network of claim 7, wherein the remote control device has a remote RFID reader/writer and the component has a component RFID assembly carrying the component information for reading thereof by the remote control device to establish the means for automatically providing.

11. The network of claim 7, wherein the server communicates with the component over a home network path, the server obtaining the component information automatically by means of network discovery protocol and providing the component information to the remote control device to establish the means for automatically providing.

12. A system comprising:
  at least one server having a server RFID component; and
  at least one component having a component RFID component, the server and component exchanging an encryption key and/or information necessary to generate the encryption key using a RFID link between the RFID components and subsequently encrypting at least some communication using the encryption key for transmission of the communication over a non-RFID link at least in part responsive to a comparison of information received over the RFID link with information received over the non-RFID link.

* * * * *